UNITED STATES PATENT OFFICE.

FELIX MALHERBE BASILE, OF JUMET, BELGIUM.

PREPARATION FOR REFACING AND HARDENING FLATTENING-STONES AND CLAY PRODUCTS.

1,110,808. Specification of Letters Patent. Patented Sept. 15, 1914.

No Drawing. Application filed September 16, 1913. Serial No. 790,124.

*To all whom it may concern:*

Be it known that I, FELIX MALHERBE BASILE, a subject of the King of Belgium, residing at Jumet, Province of Hainaut, Belgium, have invented a new and useful Preparation for Refacing and Hardening Flattening-Stones and Clay Products, of which the following is a specification.

In the art of making window glass or plate glass, window glass is usually first made in the shape of a cylinder, then it is converted from the cylindrical shape into a sheet of flat or rectilinear form, and in doing this, it is done on a flattening stone, said flattening stone being composed usually of clay, having an upper, smooth surface that comes in contact with the glass, in the process of being flattened, it being of course understood that the cylindrical sheet is heated to the proper degree during this step of flattening, so as to make it pliable and readily flattened.

My present invention relates to a novel liquid, fluid or composition of matter, composed of novel ingredients which is applied to the surface of this flattening stone, which is juxtaposed to or contiguous to the sheet of glass which is being treated, and consists of the novel ingredients in said liquid or composition of matter, which is applied to said flattening stone, which are combined in substantially the following proportions stated, the application of my novel preparation having a tendency to harden the clay of the flattening stone.

My invention consists of a fireproof composition adapted to be applied to flattening-stones in window-glass works or to surfaces of clay or similar substance, especially in glass-works where exposed to intense heat, for strengthening and smoothing such surfaces, and applicable as a coating or paint for such surfaces.

The composition consists of the following ingredients in about the following proportions, viz.—silicate of sodium, twenty-five (25) parts, silicate of potassium, twenty-five (25) parts, linseed oil, ten (10) parts, water, twenty (20) parts, and five (5) parts, each, of finely comminuted clay, red lead, finely comminuted metallic lead, and pulverized talcum. These ingredients are suitably mixed, manually or in a paint-mill or other mixer, and the composition can now be applied to the flattening stone or other surface, where, under the influence of the intense heat to which it is exposed, it will form a fireproof and smooth surface, strengthening the exposed clay-surface against the effect of the intensely hot glass and the changes of temperature from the application and removal of the blown glass cylinders and flattened sheets of glass, upon and from the flattening stone. The composition can be applied to the stone whenever the coating becomes worn, so that the stone may always have a smooth and level surface and the sheets produced will be even and level.

Other modes of applying the principle of my invention may be employed for the mode herein explained. Change may therefore be made as regards the proportions of the ingredients herein disclosed, provided the principles of invention set forth in the following claim are employed.

Having thus described my invention, what I claim as new and desire to secure by Letters Patent, is:—

A fireproof composition for coating surfaces exposed to intense heat consisting of silicate of sodium, silicate of potassium, linseed oil, water, finely comminuted clay, red lead, finely comminuted metallic lead, and pulverized talcum in about the proportions set forth.

FELIX MALHERBE BASILE.

Witnesses:
  JAS. H. MOOREHOUSE,
  H. E. HARRIS.

Copies of this patent may be obtained for five cents each, by addressing the "Commissioner of Patents, Washington, D. C."